(12) United States Patent
Maing

(10) Patent No.: US 7,979,974 B2
(45) Date of Patent: Jul. 19, 2011

(54) SYSTEM AND METHOD FOR SUCCESSIVELY FEEDING MEMBRANE ELECTRODE ASSEMBLIES AND SEPARATE PLATES OF FUEL CELL STACK

(75) Inventor: Jong Ho Maing, Cheonan (KR)

(73) Assignee: Hyundai Motor Company, Seoul (KR)

( * ) Notice: Subject to any disclaimer, the term of this patent is extended or adjusted under 35 U.S.C. 154(b) by 1029 days.

(21) Appl. No.: 11/781,502

(22) Filed: Jul. 23, 2007

(65) Prior Publication Data

US 2008/0138185 A1 Jun. 12, 2008

(30) Foreign Application Priority Data

Dec. 11, 2006 (KR) .......................... 10-2006-0125883

(51) Int. Cl.
*H01S 4/00* (2006.01)
(52) U.S. Cl. ......... 29/592.1; 29/854; 29/724; 414/788.1
(58) Field of Classification Search .................. 29/592.1, 29/854, 724, 729, 730, 771, 809; 429/30, 429/34, 12; 414/788.1, 802; 901/30, 32; 271/3.02, 3.12; 493/374
See application file for complete search history.

(56) References Cited

U.S. PATENT DOCUMENTS

| 7,020,423 | B2 * | 3/2006 | Ono et al. ..................... 399/329 |
| 2006/0062609 | A1 * | 3/2006 | Kinouchi et al. ............. 399/328 |
| 2006/0131302 | A1 * | 6/2006 | Sone et al. .................... 219/619 |

FOREIGN PATENT DOCUMENTS

KR 20060108667 10/2006
* cited by examiner

*Primary Examiner* — Raymond Alejandro
(74) *Attorney, Agent, or Firm* — Morgan, Lewis & Bockius LLP

(57) ABSTRACT

A system for feeding a fuel cell stack including fuel cells having separating plates and membrane electrode assemblies (MEAs). The system includes a separating plate supply unit for feeding the separating plates; an MEA supply unit for feeding the MEAs; a feeding unit on which the separating plates and the MEAs are fed, the feeding unit being configured to move upward and downward; and a transfer unit for receiving the separating plates and the MEAs from the separating plate supply unit and the MEA supply unit, respectively, and for loading the separating plates and the MEAs onto the feeding unit. A method for feeding a fuel cell stack includes feeding one of the separating plates, moving a magazine a predetermined amount, lowering a plate of a feeding unit, feeding one of the MEAs, and determining if the separating plates and the MEAs have been fed as much as a required number.

7 Claims, 3 Drawing Sheets

SYSTEM AND METHOD FOR SUCCESSIVELY FEEDING MEMBRANE ELECTRODE ASSEMBLIES AND SEPARATE PLATES OF FUEL CELL STACK

CROSS-REFERENCE TO RELATED APPLICATION

This application claims priority to and the benefit of Korean Patent Application No. 10-2006-0125883 filed in the Korean Intellectual Property Office on Dec. 11, 2006, the entire contents of which are incorporated herein by reference.

BACKGROUND OF THE INVENTION (a) Field of the Invention

The present invention relates to a system and a method for feeding a fuel cell stack, that can successively feed membrane electrode assemblies (MEAs) and separating plates.

(b) Description of the Related Art

Generally, a fuel cell stack is formed by successively feeding a plurality of unit cells, and each unit cell is formed by sequentially feeding a membrane electrode assembly (MEA) and a separating plate. Each separating plate and MEA is sequentially fed by a robot, one after the other. The system for feeding the fuel cell stack occupies a wide space. In addition, processing time is long.

The above information disclosed in this Background section is only for enhancement of understanding of the background of the invention and therefore it may contain information that does not form the prior art that is already known in this country to a person of ordinary skill in the art.

SUMMARY OF THE INVENTION

A system for feeding a fuel cell stack including fuel cells having separating plates and membrane electrode assemblies (MEAs). The system includes a separating plate supply unit for feeding the separating plates; an MEA supply unit for feeding the MEAs; a feeding unit on which the separating plates and the MEAs are fed, the feeding unit being configured to move upward and downward; and a transfer unit for receiving the separating plates and the MEAs from the separating plate supply unit and the MEA supply unit, respectively, and for loading the separating plates and the MEAs onto the feeding unit.

The separating plate supply unit includes a pallet for temporarily storing the separating plates, and at least one roller for rolling the separating plates from the pallet to the transfer unit. At least one of the rollers has a fluorine series rubber surface, and at least another one of the rollers has a steel surface.

The MEA supply unit includes a pallet for temporarily storing the MEAs, and at least one roller for rolling the MEAs from the pallet to the transfer unit. The roller has a fluorine series rubber surface.

The feeding unit includes a plate on which the separating plates and MEAs are located, and a servo motor for moving the plate upward and downward. The feeding unit is slanted in relation to the separating plate supply unit and the MEA supply unit.

The transfer unit includes a magazine for receiving the separating plates and the MEAs from the separating plate supply unit and the MEA supply unit, respectively; a servo motor generating power such that the magazine transmits the separating plates and the MEAs to the feeding unit; and at least one roller receiving the power from the second servo motor and transmitting the power to the magazine. The transfer unit is slanted in relation to the separating plate supply unit and the MEA supply unit.

The at least one roller of the transfer unit includes a first roller, a second roller, and an third roller supporting the magazine. A straight line formed by a connection between the first roller and the second roller, and another straight line formed by a connection between the second roller and the third roller, are slanted with respect to vertical.

The transfer unit includes at least one drive shaft, which can be synchronized together with a drive shaft of another transfer unit.

A method for feeding a fuel cell stack includes feeding one of the separating plates, moving a magazine a predetermined amount, lowering a plate of a feeding unit, feeding one of the MEAs, and determining if the separating plates and the MEAs have been fed as much as a required number.

The method also includes removing the stack if the separating plates and the MEAs have been fed as much as the required number, loading a collector panel, and moving the plate to a home position thereof.

The method also includes, if the separating plates and the MEAs have not been fed as much as the required number, further feeding the separating plates and the MEAs.

DETAILED DESCRIPTION OF THE PREFERRED EMBODIMENTS

Exemplary embodiments of the present invention will hereinafter be described in detail with reference to the accompanying drawings.

Figure 1:
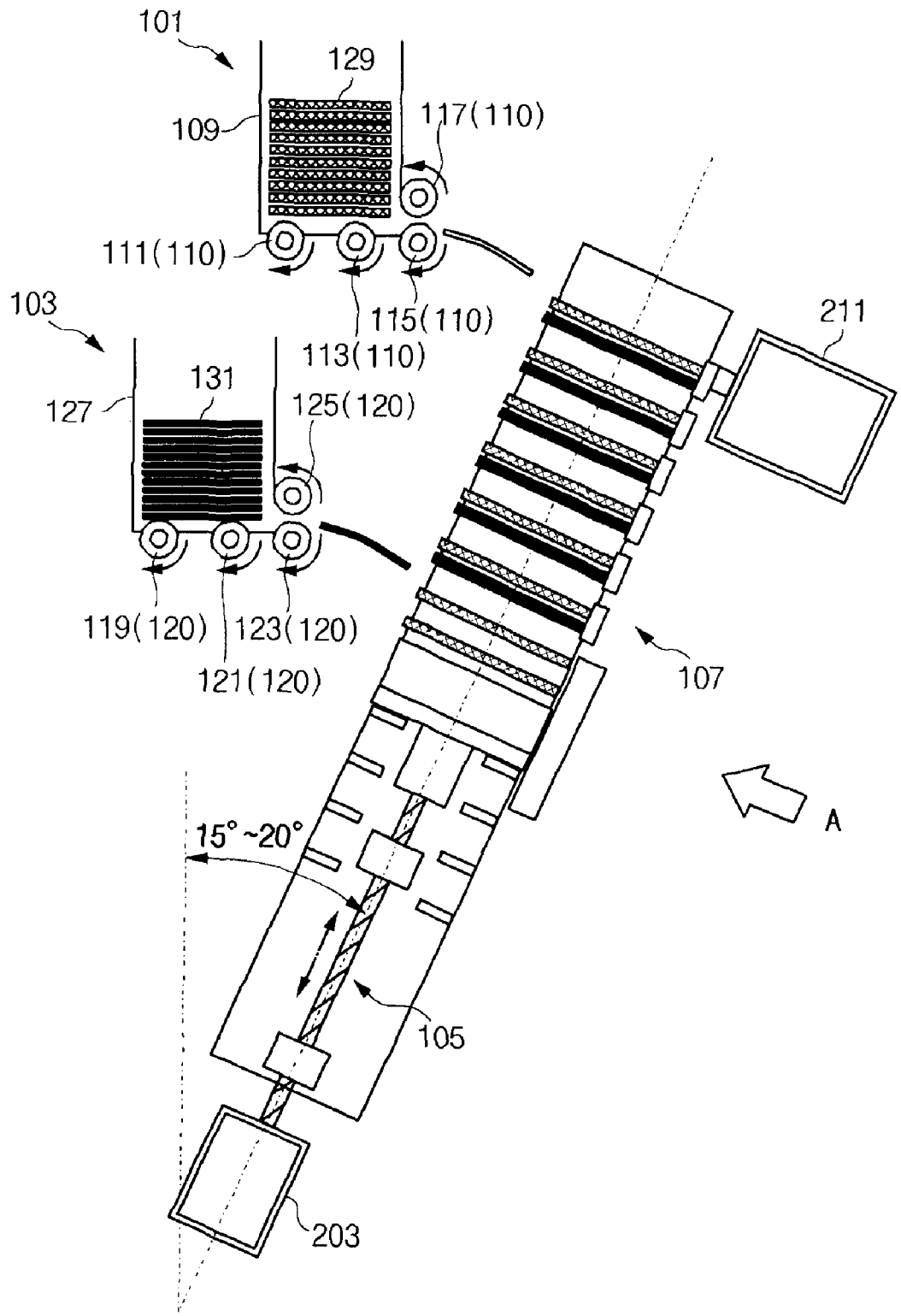
FIG. 1 shows a system for feeding a fuel cell stack according to an exemplary embodiment of the present invention.
Figure 2:
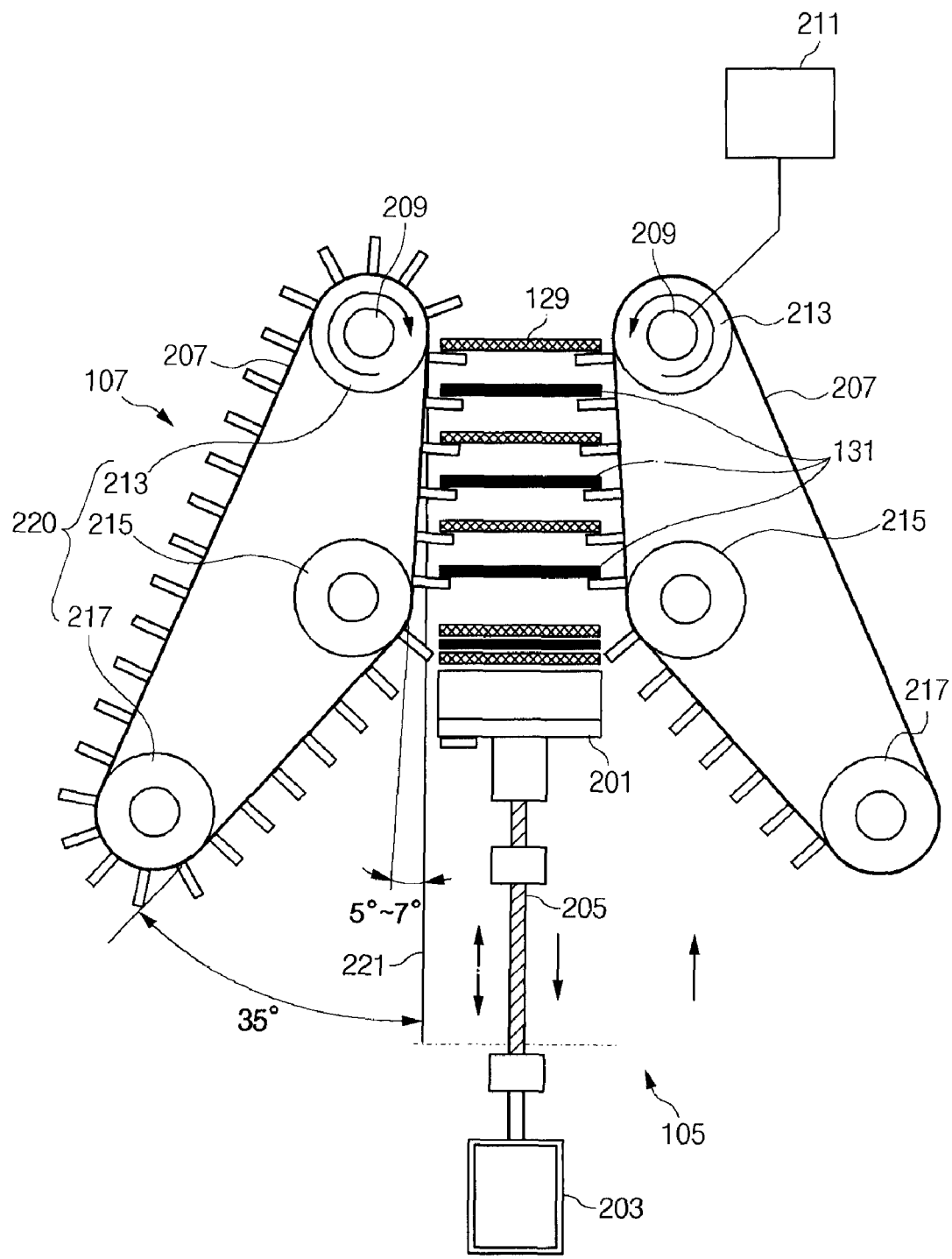
FIG. 2 is a cross-sectional view taken along arrow "A" of FIG. 1.

Referring to FIG. 1 and FIG. 2, an exemplary system feeds fuel cells including separating plates and membrane electrode assemblies (MEAs) to form a stack. The system includes a separating plate supply unit 101, which successively feeds separating plates 129, and an MEA supply unit 103, which successively feeds MEAs 131. The system also includes a feeding unit 105, on which the separating plates 129 and the MEAs 131 are sequentially fed. The feeding unit 105 moves upward and downward during feeding. The system also includes a transfer unit 107, which receives the separating plates 129 and the MEAs 131 from the separating plate supply unit 101 and the MEA supply unit 103, respectively, and sequentially and successively places them on the feeding unit 105.

As shown in FIG. 1, when the separating plate supply unit 101 and the MEA supply unit 103 respectively feed the separating plates 129 and the MEAs 131 to the transfer unit 107, the transfer unit 107 sequentially and successively feeds the separating plates 129 and the MEAs 131 to the feeding unit 105.

The separating plate supply unit 101 includes a first pallet 109 temporarily storing the separating plates 129, and at least one first roller 110 rotating in the direction of the arrows such that the separating plates 129 move to the transfer unit 107.

The MEA supply unit 103 includes a second pallet 127 temporarily storing the MEAs 131, and at least one second roller 120 rotating in the direction of the arrows such that the MEAs 131 move to the transfer unit 107.

The first roller 110 includes third rollers 111, 113, and 117 coated with a fluorine series rubber, and a fourth roller 115 having a steel surface. The second roller 120 includes fifth rollers 119, 121, 123, and 125 coated with a fluorine series rubber. Impurities caused by abrasion from the roller surfaced are prevented by the rollers being coated with fluorine series rubber.

The feeding unit 105 includes a plate 201, on which the separating plates 129 and the MEAs 131 are located; a first servo motor 203, which moves the plate 201 upward and downward, and a rod 205, which connects the plate 201 with the first servo motor 203.

The feeding unit 105 is slanted in relation to the separating plate supply unit 101 and the MEA supply unit 103. The separating plates 129 and the MEAs 131 slip due to the predetermined angle, and so can be located to a predetermined position of the transfer unit 107.

Referring to FIG. 2, when the separating plates 129 and the MEAs 131 are transmitted from the transfer unit 107 to the feeding unit 105, the plate 201 moves downward as much as one pitch by the rotation of the first servo motor 203 and the rod 205. One pitch may be equal to the thickness of the separating plates 129 and the MEAs 131.

The transfer unit 107 includes a magazine 207, which receives the separating plates 129 and the MEAs 131 respectively from the separating plate supply unit 101 and the MEA supply unit 103; a second servo motor 211, which generates power such that the magazine 207 transmits the separating plates 129 and the MEAs 131 to the feeding unit 105; and at least one roller 220, which receives the power from the second servo motor 211 and transmits the power to the magazine 207.

The transfer unit 107 is also slanted in relation to the separating plate supply unit 101 and the MEA supply unit 103.

When the separating plates 129 and the MEAs 131 are respectively loaded on the magazine 207 by the separating plate supply unit 101 and the MEA supply unit 103, the magazine 207 rotates due to the second servo motor 211, thereby transmitting the separating plates 129 and the MEAs 131 to the feeding unit 105.

The at least one roller 220 includes a sixth roller 213, a seventh roller 215, and an eighth roller 217 supporting the magazine 207. Referring to FIG. 2, a straight line formed by connecting the sixth roller 213 and the seventh roller 215 may form an angle of from 5° to 7° in relation to a vertical line 221, and the straight line formed by connecting the seventh roller 215 and the eighth roller 217 may form an angle of 35° in relation to the vertical line 221, but the present invention is not limited to these angles.

The predetermined angles can be selected by a person of ordinary skill in the art based on size of the separating plates 129 and the MEAs 131 and a capacity of the fuel cells.

As shown in FIG. 2, the separating plates 129 and the MEAs 131 can be transmitted from the transfer unit 107 to the feeding unit 105 due to the straight line formed by the sixth roller 213 and the seventh roller 215.

The transfer unit 107 further includes at least one drive shaft 209, and each drive shaft 209 of a pair of transfer units 107 can be synchronized together. That is, speeds of the magazines 207 of a pair of transfer units 107, located at right and left sides in FIG. 2, can be synchronized, and thereby the separating plates 129 and the MEAs 131 can be automatically loaded on the feeding unit 1057.

Therefore, according to an exemplary embodiment of the present invention, processing time is reduced because the separating plates 129 and the MEAs 131 are successively fed by the separating plate supply unit 101 and the MEA supply unit 103, respectively, and the separating plates 129 and the MEAs 131 are then sequentially and successively fed onto the feeding unit 105 by the transfer unit 107. In addition, the inventive system does not take up a large space.

Figure 3:
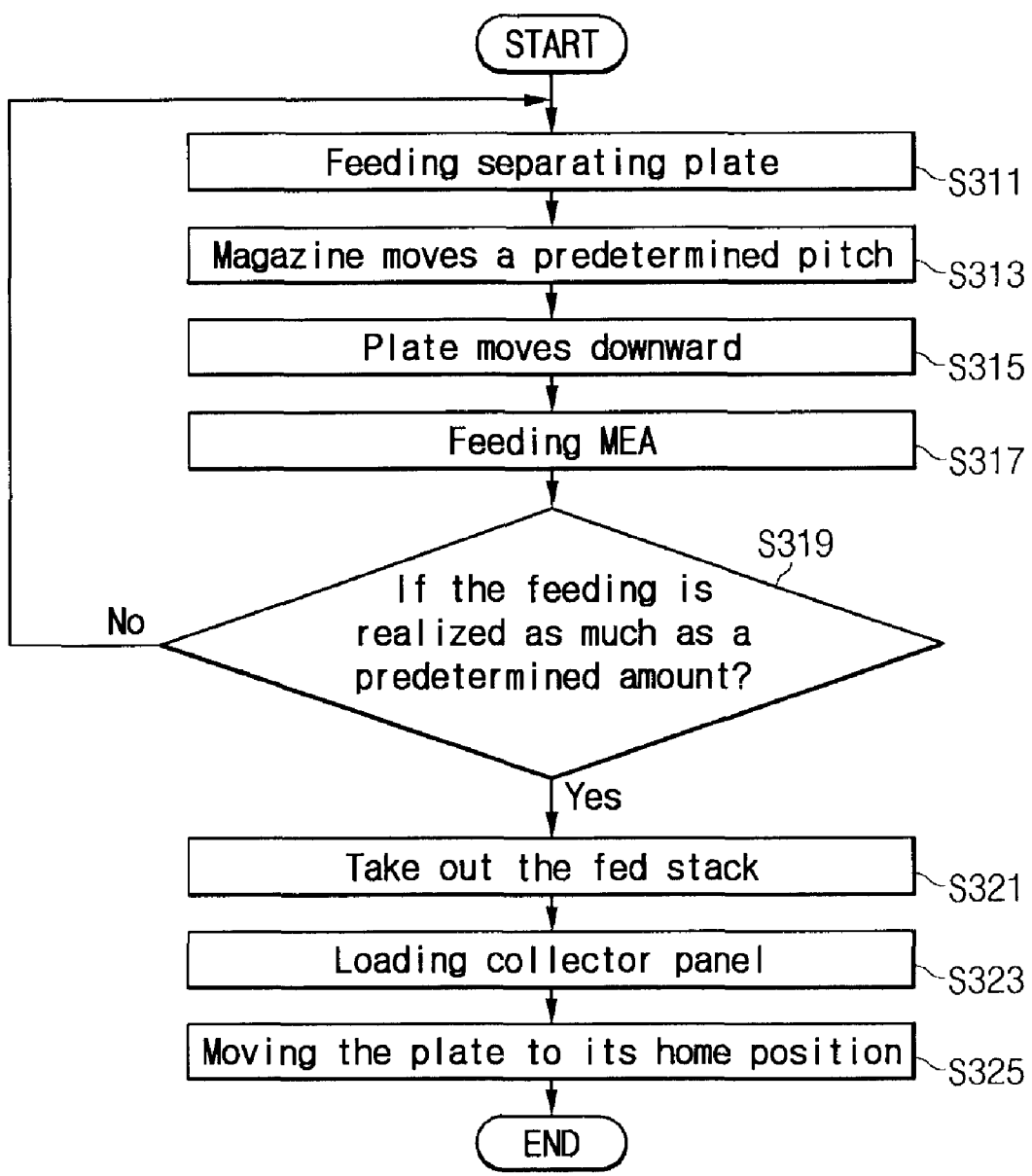
FIG. 3 is a flow chart showing a method for feeding a fuel cell stack according to an exemplary embodiment of the present invention.

Referring to FIG. 3, a method for feeding fuel cells including separating plates and membrane electrode assemblies (MEAs) to form a stack according to an exemplary embodiment of the present invention will now be described.

First, one separating plate 129 is fed onto the feeding unit 105 at step S311.

Then, the magazine 207 is moved as much as a predetermined pitch at step S313, and the plate 201 of the feeding unit 105 is moved downward as much as the predetermined pitch at step S315.

The predetermined pitch indicates a distance that the magazine 207 moves and may be selected by a person of ordinary skill in the art based on the capacity of the fuel cell.

Next, one MEA 131 is fed onto the feeding unit 105 at step S317, and it is determined whether the separating plates 129 and the MEAs 131 have been fed in a number required for the finished fuel cell stack to be manufactured.

If the separating plates 129 and the MEAs 131 have been fed in the required number, the finished stack is taken out at step S321, a collector panel is loaded at step S323, and the plate 201 is moved to its home position at step S325.

If the separating plates 129 and the MEAs 131 have not been fed in the required number at step S319, step S311 is repeated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for feeding a fuel cell stack, the stack comprising fuel cells comprising separating plates and membrane electrode assemblies (MEAs), the system comprising:
a separating plate supply unit for feeding the separating plates;
an membrane electrode assembly (MEA) supply unit for feeding the MEAs;
a feeding unit on which the separating plates and the MEAs are fed, the feeding unit being configured to move upward and downward; and
a transfer unit for receiving the separating plates and the MEAs from the separating plate supply unit and the MEA supply unit, respectively, and for loading the separating plates and the MEAs onto the feeding unit,
wherein a longitudinal axis of the transfer unit is slanted with respect to longitudinal axes of the separating plate supply unit and the MEA supply unit with a predetermined angle,
wherein the transfer unit receives the separating plates from the separating plate supply unit and the MEAs from the MEA supply unit, transports the separating plate and the MEA along an axial direction of the feeding unit, and loads the separating plate and the MEA onto the feeding unit; and wherein the transfer unit comprises:
a magazine for receiving the separating plates and the MEAs from the separating plate supply unit and the MEA supply unit, respectively;
a servo motor generating power to actuate the magazine such that the magazine transfers the separating plates and the MEAs onto the feeding unit; and
at least one roller receiving the power from the servo motor and transmitting the power to the magazine;
wherein the at least one roller comprises a first roller, a second roller, and an third roller supporting the magazine, wherein a straight line formed by a connection between the first roller and the second roller and another straight line formed by a connection between the second roller and the third roller are slanted with respect to the longitudinal axis of the feeding unit.

2. The system of claim 1, wherein the separating plate supply unit comprises a pallet for temporarily storing the separating plates; and at least one roller for rolling the separating plates from the pallet to the transfer unit.

3. The system of claim 2, wherein the at least one roller comprises at least one roller with a fluorine series rubber surface; and at least one roller with a steel surface.

4. The system of claim 1, wherein the MEA supply unit comprises a pallet for temporarily storing the MEAs; and at least one roller for rolling the MEAs from the pallet to the transfer unit.

5. The system of claim 4, wherein the at least one roller comprises a fluorine series rubber surface.

6. The system of claim 1, wherein the feeding unit comprises:
a plate on which the separating plates and MEAs are located; and
a servo motor for moving the plate upward and downward;
wherein the feeding unit is slanted in relation to the separating plate supply unit and the MEA supply unit.

7. The system of claim 1, wherein the transfer unit comprises at least one drive shaft, wherein the at least one drive shaft can be synchronized together with a drive shaft of another transfer unit.

* * * * *